Oct. 18, 1960  R. A. MARSHALL  2,956,670
MEANS AND METHOD OF PACKAGING FRAGILE ARTICLES
Filed June 12, 1958  2 Sheets-Sheet 1

INVENTOR.
ROBERT A. MARSHALL
BY
AGENT

Oct. 18, 1960  R. A. MARSHALL  2,956,670
MEANS AND METHOD OF PACKAGING FRAGILE ARTICLES
Filed June 12, 1958  2 Sheets-Sheet 2

INVENTOR.
ROBERT A. MARSHALL
BY
AGENT 2,956,670
Patented Oct. 18, 1960

United States Patent Office

2,956,670

MEANS AND METHOD OF PACKAGING FRAGILE ARTICLES

Robert A. Marshall, Wilton, Conn., assignor, by mesne assignments, to The Machlett Laboratories, Incorporated, Springdale, Conn., a corporation of Connecticut Filed June 12, 1958, Ser. No. 741,685

4 Claims. (Cl. 206—46)

This invention relates to shipping devices for fragile articles and has particular reference to novel means and method of packaging fragile articles such as electron discharge devices in a manner which prevents the articles from becoming damaged when the containers in which they are mounted are subjected to vibration or mechanical shock.

A considerable amount of damage occurs during shipment of fragile articles such, for example, as electron tubes which have delicate and easily broken filaments, or X-ray tubes which have heavy metal portions extending through glass envelopes and connected to the envelopes by relatively delicate glass-to-metal seals. Such damage is usually caused by the accidental application of vibration or mechanical shock or both to the containers in which the articles are packed.

Shock-absorbing materials such as rubber, foam plastic, shredded paper, rubberized hair, springs, or woven materials have been placed within containers in surrounding relation to the articles, as attempts to provide means for absorbing some of the shock to which the containers may be subjected and to thereby cushion the articles. In all known cases the containers in which the articles are packed are flat-sided containers which are square or rectangular in shape.

In such known devices, I have found that there is an unequal distribution of the shock-absorbing packing material surrounding the articles. Therefore, when a container is subjected to mechanical shock or vibration, the article inside the container may be deflected in a direction parallel to the direction in which the shock is applied, or the container may be distorted so as to compress the packing material. This results, in either case, in unequal distribution of the packing material around the article, permitting possible undesired movement of the article within the container and, sometimes, undesirable movement of one part of the article with respect to another part.

It is, accordingly, a principal object of the present invention to overcome the deficiencies of prior art means and methods of packaging fragile articles by providing novel means whereby portions of an article are respectively restricted in their movements within a cylindrical container.

Another object is the provision of novel means and method of packaging a fragile article whereby various parts of the article which are of unequal weight are individually restricted in their movements within the container, by virtue of the fixed mounting of the heavy portion of the article in one end of the container and uniform packing around the lighter portion, whereby the moments of each portion when the article is subjected to mechanical shock are substantially equal.

A further object is the provision of a hollow, cylindrical, rigid container having means at one end for substantially rigid securement of a relatively heavy portion of an X-ray tube or the like, and having an annular layer of selected slightly-compressible, shock-absorbing, packing material therewithin surrounding the lighter-weight and fragile envelope of the tube, the envelope being rigidly connected to and supported by the heavy portion, and the annular layer being substantially uniformly thick at all points in any given plane perpendicular to the axis of the envelope whereby, upon application of mechanical shock or vibration to the container, the effect of the shock or vibration upon the envelope, or upon the junction between the heavy portion and the envelope is negligible.

Other objects and advantages of the invention will become apparent from the following description taken in connection with the accompanying drawings, wherein—

Figure 1:
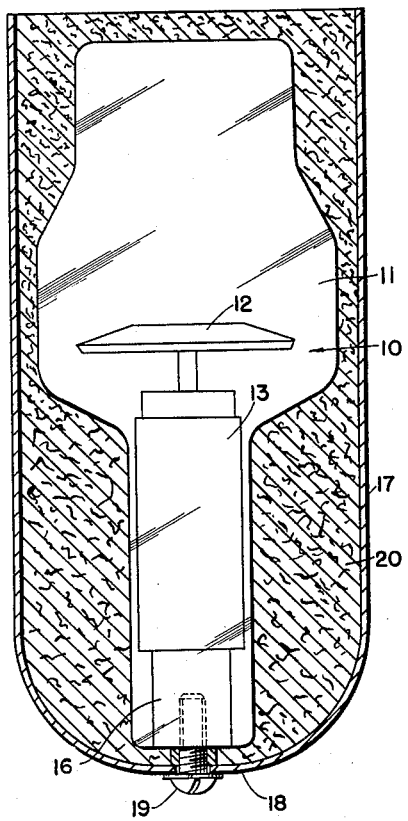
Fig. 1 is an axial sectional view of a preferred embodiment of the invention.
Figures 4, 5:
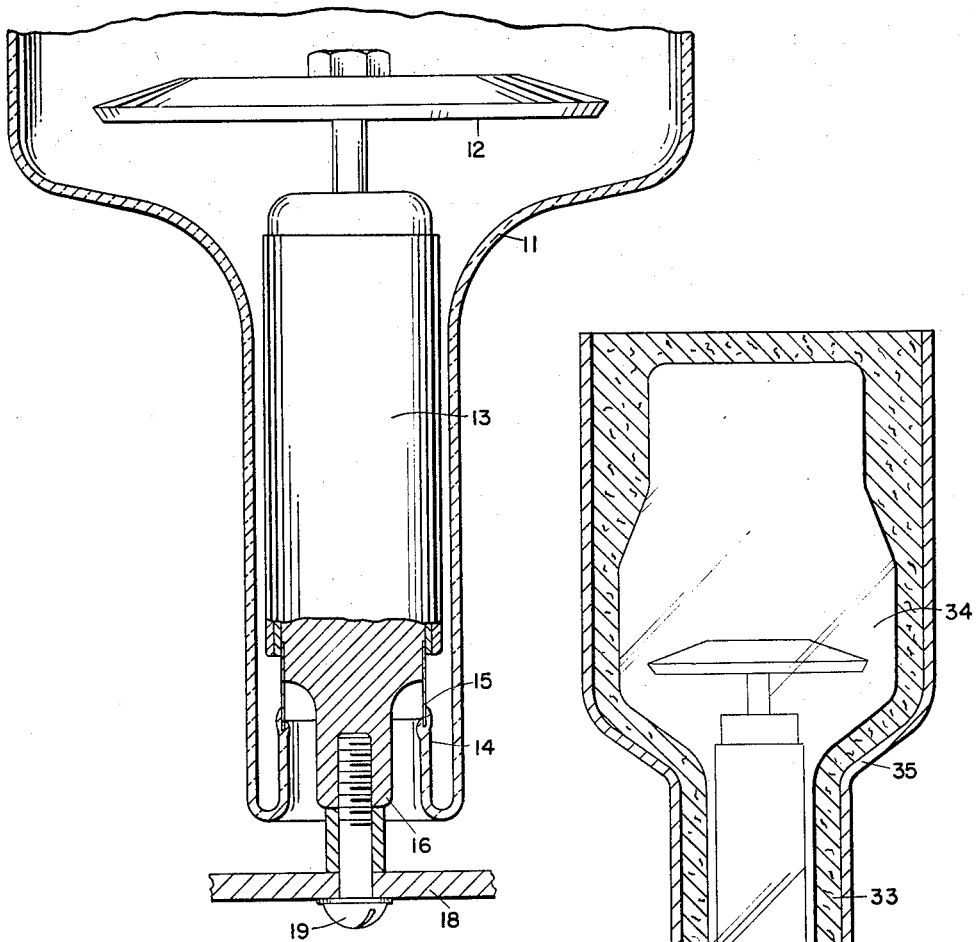
Fig. 4 is an axial sectional view of another modified embodiment of the container.
Fig. 5 is an enlarged fragmentary sectional view of an X-ray tube showing the heavy anode structure which supports the fragile envelope.

Referring more particularly to the drawings, there is shown in Figs. 1 and 5 an X-ray tube 10 of conventional design which embodies a fragile glass or ceramic envelope 11 housing the usual electrodes. In X-ray tubes of the rotating anode type, the anode electrode 12 is carried by metal bearings mounted within relatively heavy housing or rotor 13. The anode, bearings, housing, rotor, and associated parts combine to form a metal structure 16 which actually comprises the heaviest portion of the tube and which is mounted as a unit in one end of the envelope on a fragile reentrant neck portion 14, the connecting means being a relatively delicate glass-to-metal or ceramic-to-metal seal 15. One end of the heavy structure 16 is exposed through the reentrant end of the envelope.

In accordance with known types of packaging methods, such tubes are generally placed within square or rectangular-shaped containers and are sometimes suspended therein by springs or are packed in rubber, rubberized hair, paper, excelsior, or like material. In some instances these tubes are mounted within inner containers of square or rectangular shape, with their heavy portions bolted or otherwise fixed to the container, and the envelope enclosed by a compressible material. The container is subsequently enclosed within a shock-absorbing material.

When such a package is subjected to mechanical shock or vibration, the heavy portion which is bolted to the container remains relatively rigid, moving only to the slight extent permitted by the inherent flexibility of the connection and of the materials of the parts. The envelope 11, however, being supported by the delicate seal 15, sometimes moves a relatively great distance. These unequal moments are, of course, undesirable because then breakage sometimes occurs at the glass-to-metal seals 15.

The reentrant necks 14 of X-ray tubes are relatively short compared to the overall lengths of the glass envelopes 11. Therefore, since the fragile envelope and the heavy anode structure are connected together near one end of the tube, this places severe strain on the seal 15. For example, when a tube is at rest in a horizontal position upon a bench or the like, the moment of the heavy anode structure varies from about 7.5 inch pounds to about 11.6 inch pounds depending upon the size of the tube. When the anode structure is bolted down, the moment of the envelope is about 3 inch pounds. Practically all of the strain occurs at the seal 15. Therefore, it is important that means be provided to overcome the unequal distribution of stresses when packaging such tubes.

While conventional prior art packaging sometimes includes surrounding the envelope with compressible material, non-uniformity in the thickness of the packing material throughout the circumference of the envelope in any given plane is undesirable because, upon subjection of a carton to mechanical shock and resultant stress upon an envelope, non-uniformly thick packing material and possible distortion in a side of the container will allow movement of the envelope, sometimes greater distances in some directions than in others.

Packing material can of course be compressed due to its inherent structural characteristics. To properly protect tubes of the character described, I have found it advisable to restrict the extent to which the envelope may move in any one direction with respect to its enclosing container while, however, allowing some cushioning to take place. If a square or rectangular carton is subjected to shock in such a way that the envelope will be impelled toward a corner of the carton, the fact that the envelope can move a relatively great distance with respect to the more restricted heavy portion may cause breakage at the seal between the envelope and the heavy metal structure. However, it is not desirable to rigidly secure the envelope so that no movement is possible because this would allow mechanical shock to be transmitted directly to the envelope which would result in breakage of the envelope itself.

In accordance with this invention I have found that a rigid hollow cylindrical container 17 must be used, and in the cylindrical container the tube 10 is mounted by firmly securing the heavy metal structure 16 to the base 18 as by a bolt 19. Then the selected packing material 20 in inserted into the container in surrounding relation to the envelope.

In such a cylindrical container package it is apparent that the thickness of the packing material is substantially uniform in any selected plane perpendicular to the longitudinal axis of the tube; that is, the thickness at any selected point in such a plane is consistent with the thickness at all other points in the same plane.

The spacing between the inner surface of the container and outer surface of the envelope can be determined in accordance with the resiliency or compressibility of the particular packing material used so that the container functions to rigidize the envelope to some extent and so that the extent of actual movement of the envelope is restricted but not entirely prevented. The resiliency and thickness of the material should be such that the moments or extents of movement allowed the envelope 11 are, within tolerable limits, similar to the heavy structure 16.

Figure 2:
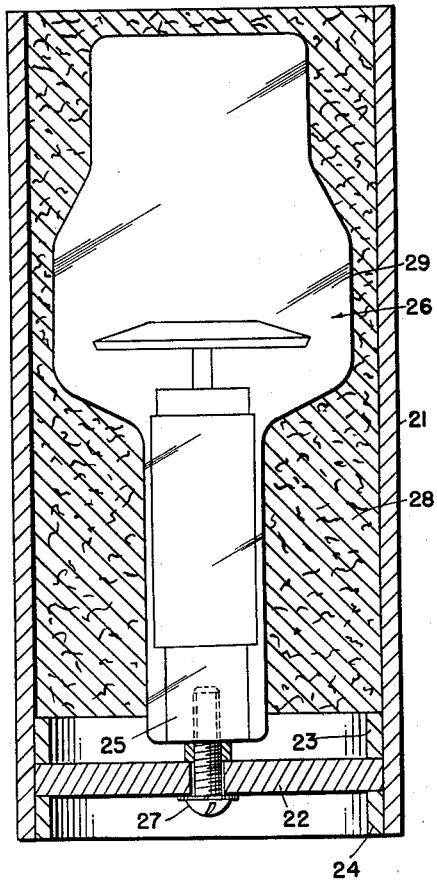
Fig. 2 is an axial sectional view of a modified form of the invention.

The container 17 shown in Fig. 1 is a one-piece spun aluminum member having an integrally formed bottom or base 18. However, the container 21 shown in Fig. 2 is formed of any relatively rigid tubular material such as wood, metal, pressed board, or the like having a separate disclike base 22 which is held in place between a pair of opposed annular retaining rings 23 and 24 securely adhesively affixed to the inner wall of the container 21. The heavy metal structure 25 of the tube 26 is rigidly secured to base 22 as by the bolt 27, and selected packing material 28 is placed between the container 21 and the envelope 29.

In either type of container, the packing material is of uniform thickness at all points in any given plane perpendicular to the axis of the tube, as pointed out above.

Figure 3:
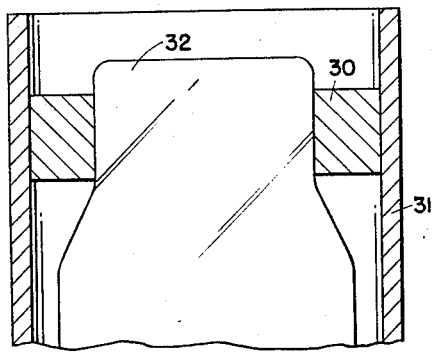
Fig. 3 is a fragmentary axial sectional view of a device embodying an annular restraining ring.

Although the preferred packing material is a compressible material such as excelsior, rubber, foam plastic, rubberized hair, or the like, it is also possible within the scope of the invention to encircle the free end of the envelope with a ring 30 (Fig. 3) formed of rubber or other resilient material having known resiliency characteristics and of uniform thickness at all points in a plane perpendicular to its axis. Such a ring 30 should also be of controlled inside and outside diameters so that it will fit relatively snugly within the container 31 and in snug encircling relation to the envelope 32. In such a case ring 30 will be used instead of loose packing material.

The container itself may be still further modified as shown in Fig. 4 so that the thickness of packing material 33 is substantially uniform throughout the greater portion of the length of the envelope 34. This is accomplished by shaping the inner surface of the container 35 to substantially the shape of the exterior of the envelope. Although the extreme upper portion of container 35 does not conform to the shape of the corresponding portion of envelope 34, this can be successfully achieved if desired by making the upper and lower portions of the container as separate pieces, joined together by threads or otherwise, with the inner surfaces of each portion being shaped to the contours of the portions of the envelope which they respectively enclose. In such a modification the thickness of the packing material 33 is uniform throughout the length of the envelope.

It will be apparent from the foregoing description that novel means and method of packaging fragile articles has been provided in accordance with the objects of this invention, by the provision of a packaging structure wherein the envelope is enclosed by a layer of selected compressible packing material which is of a substantially uniform thickness at all points in a given plane perpendicular to the axis of the envelope, with the outer surface of the layer being rigidized as by the rigid walls of a container so as to restrict it to the desired initial configuration whereby movement of the envelope is uniformly restrained in all radial directions, and whereby the envelope may move uniformly with a heavy metal structure to which it is connected.

It will also be apparent that certain other modifications may be made by those skilled in the art without departing from the spirit of the invention as expressed in the accompanying claims. All matter shown and described is, therefore, to be considered as illustrative and not in a limiting sense.

I claim:

1. A packaging structure for an electron tube having an envelope of generally circular external configuration in any plane perpendicular to its axis and a comparatively heavy device relatively delicately supported adjacent one end within one end of the envelope with said end of the device being exposed through the end of the envelope, and the device being of a length to extend a substantial distance axially of and within the envelope, said structure comprising a substantially rigid, hollow container within which the tube is coaxially positioned and having a rigid base at one end thereof, the exposed end of the heavy device being rigidly secured to the base whereby mechanical shocks applied to the container will introduce movements of predetermined degree to the opposite end of the heavy device, and a supply of compressible packing material between the envelope and the container of substantially uniform thickness at all points in any given plane therethrough perpendicular to the axis of the tube, the resiliency of the packing material being of a predetermined value such that movements introduced to the envelope upon application of mechanical shocks to the container will be substantially equal to the moments of the heavy device.

2. A packaging structure as set forth in claim 1 wherein the inner surface diameter of the container throughout the major portion of its length is uniform and slightly larger than the largest outside diameter of the envelope.

3. A packaging structure as set forth in claim 1 wherein the inner surface of the container is shaped to conform substantially to the shape of the major portion of the envelope and is slightly larger than the envelope so that the space therebetween is substantially uniform in width throughout the length of the conforming surface.

4. A packaging structure as set forth in claim 1 wherein the packing material is a ring of resilient compressible matter snugly encircling the end portion of the envelope opposite that end which supports the heavy device and interfitting within the container, the ring being of uniform thickness throughout its circumference in a plane perpendicular to its axis.

References Cited in the file of this patent

UNITED STATES PATENTS

| | | |
|---|---|---|
| 205,614 | Coleman | July 2, 1878 |
| 1,001,717 | Weatherby | Aug. 29, 1911 |
| 1,464,835 | Snyder | Aug. 14, 1923 |
| 1,602,326 | Bjorkstedt | Oct. 5, 1926 |
| 1,693,199 | Fair | Nov. 27, 1928 |
| 2,265,664 | Markert | Dec. 9, 1941 |
| 2,330,346 | Elliott | Sept. 28, 1943 |
| 2,387,427 | Atlee | Oct. 23, 1945 |

FOREIGN PATENTS

| | | |
|---|---|---|
| 1,000,130 | France | Oct. 10, 1951 |